US012692185B2

(12) United States Patent
Ouerghemmi et al.

(10) Patent No.: US 12,692,185 B2
(45) Date of Patent: Jul. 28, 2026

(54) METHOD FOR CONTROLLING A FIBERIZING DEVICE

(71) Applicant: SAINT-GOBAIN ISOVER, Courbevoie (FR)

(72) Inventors: Ezzeddine Ouerghemmi, Antony (FR); Kevin Jourde, Grenoble (FR); François Vianey, Paris (FR); Guillaume Paillard, Agnetz (FR); Hans Michael Lieberknecht, Margny les Compiegne (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 151 days.

(21) Appl. No.: 18/567,622

(22) PCT Filed: Jun. 3, 2022

(86) PCT No.: PCT/FR2022/051062
§ 371 (c)(1),
(2) Date: Dec. 6, 2023

(87) PCT Pub. No.: WO2022/258918
PCT Pub. Date: Dec. 15, 2022

(65) Prior Publication Data
US 2024/0279105 A1 Aug. 22, 2024

(30) Foreign Application Priority Data
Jun. 7, 2021 (FR) ...................................... 2105959

(51) Int. Cl.
C03B 37/07 (2006.01)
C03B 37/04 (2006.01)
(52) U.S. Cl.
CPC ............ *C03B 37/07* (2013.01); *C03B 37/045* (2013.01)

(58) Field of Classification Search
CPC ........................ C03B 37/04–055; C03B 37/07
See application file for complete search history.

(56) References Cited

U.S. PATENT DOCUMENTS 3,337,316 A * 8/1967 Fletcher ................ C03B 37/041
425/7
4,203,745 A * 5/1980 Battigelli .............. C22C 19/053
65/461
(Continued)

FOREIGN PATENT DOCUMENTS

CN 104370461 A * 2/2015 ............. C03B 37/07
CN 109067825 A 12/2018
(Continued)

OTHER PUBLICATIONS

CN-104370461-A (Chen) Feb. 25, 2015 (English language translation). [online] [retrieved Nov. 18, 2025] Retrieved from: Clarivate Analytics. (Year: 2015).*
(Continued)

*Primary Examiner* — Erin Snelting
(74) *Attorney, Agent, or Firm* — CUSHMAN PARTNERS, LLC

(57) ABSTRACT

A method for forming glass fibers by a rotary assembly including a shaft rotated about an axis of rotation, a centrifuge secured to the shaft and provided with a primary annular wall including a plurality of primary orifices, and a supply system configured to supply the centrifuge with molten glass, and wherein, under the effect of a centrifugal force resulting from a rotation of the rotary assembly, a primary reserve of glass is formed against the primary annular wall of the centrifuge, the method including a) acquiring, using a camera, of at least one primary image of the centrifuge, b) processing the at least one primary image by an image processing system, and c) evaluating a param- (Continued)

eter representative of a volume of the primary reserve by a system for processing the data from the primary image.

15 Claims, 3 Drawing Sheets

(56) References Cited

U.S. PATENT DOCUMENTS

| 4,718,930 | A | * | 1/1988 | Gartner | ................. | C03B 37/048 |
| | | | | | | 65/459 |
| 5,259,857 | A | * | 11/1993 | Pasquier | ................. | C03B 37/07 |
| | | | | | | 425/8 |
| 2004/0112093 | A1 | * | 6/2004 | Beaufils | ................. | C03B 37/045 |
| | | | | | | 428/407 |
| 2007/0261446 | A1 | * | 11/2007 | Baker | ...................... | D04H 3/07 |
| | | | | | | 65/459 |
| 2012/0270718 | A1 | * | 10/2012 | Boulanov | ............. | C03B 37/045 |
| | | | | | | 501/36 |
| 2016/0161419 | A1 | * | 6/2016 | Trdic | ..................... | G01N 11/00 |
| | | | | | | 250/573 |

FOREIGN PATENT DOCUMENTS

| DE | 35 36 137 | C1 | | 12/1986 | | |
| EP | 0080963 | A1 | * | 6/1983 | ........... | C03B 37/055 |
| EP | 1 370 496 | A1 | | 12/2003 | | |
| EP | 2177484 | A2 | * | 4/2010 | ............ | C03B 37/07 |
| FR | 2 443 436 | A1 | | 7/1980 | | |
| FR | 2704544 | A1 | * | 11/1994 | ............ | G01D 5/342 |
| WO | WO 02/070417 | A1 | | 9/2002 | | |
| WO | WO-2015041610 | A1 | * | 3/2015 | ........... | C03B 37/055 |

OTHER PUBLICATIONS

EP-0080963-A1 (Mathgen) Jun. 8, 1983 (English language translation). [online] [retrieved Nov. 18, 2025] Retrieved from: Clarivate Analytics. (Year: 1983).*

FR-2704544-A1 (Melinand) Nov. 4, 1994 (English language translation). [online] [retrieved Nov. 18, 2025] Retrieved from: Clarivate Analytics. (Year: 1994).*

International Search Report as issued in International Patent Application No. PCT/FR2022/051062, dated Aug. 16, 2022.

* cited by examiner

[Fig. 1]
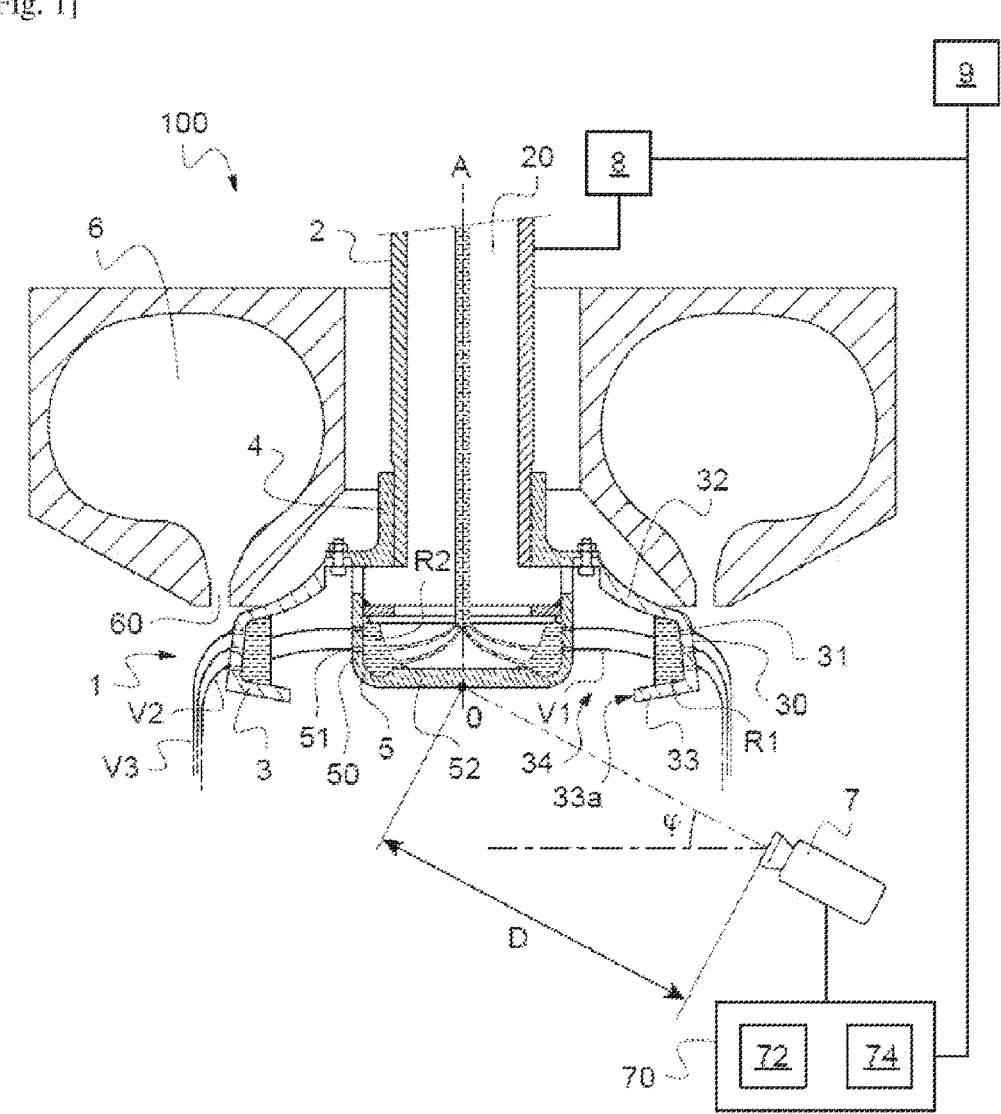

[Fig. 2]
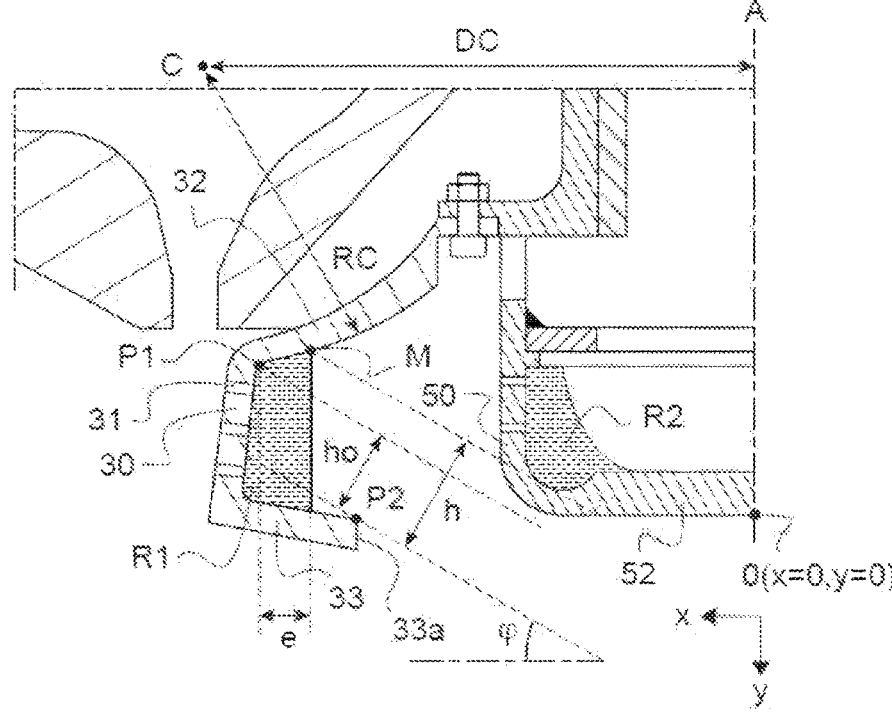
[Fig. 3]
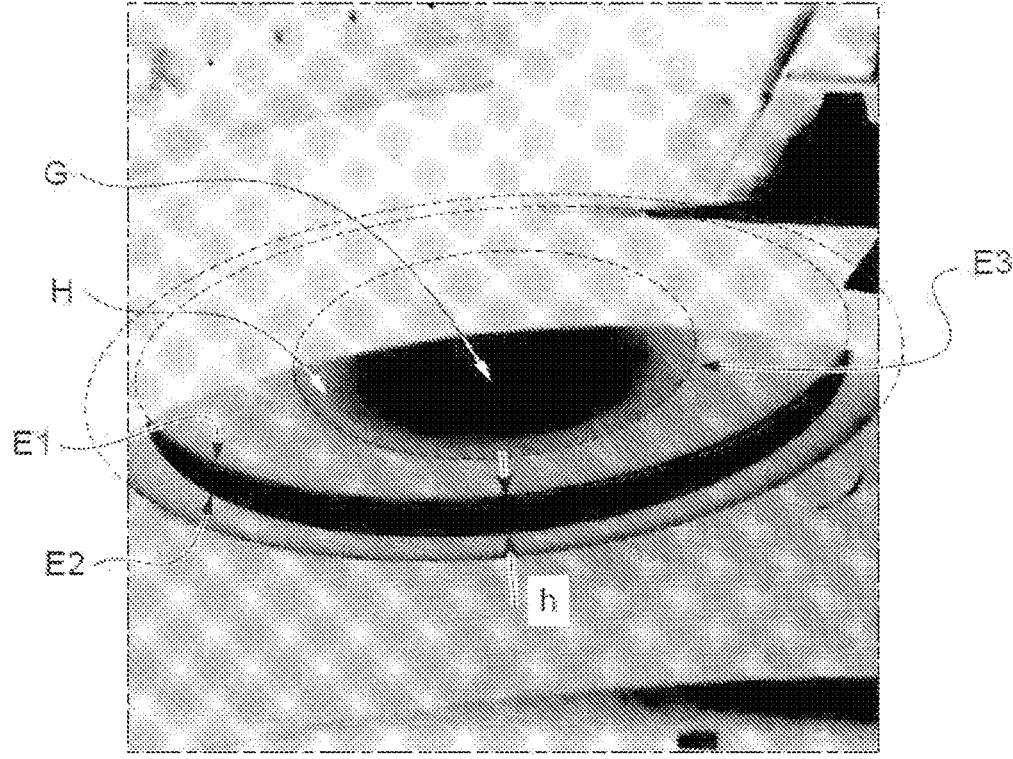

[Fig. 4]
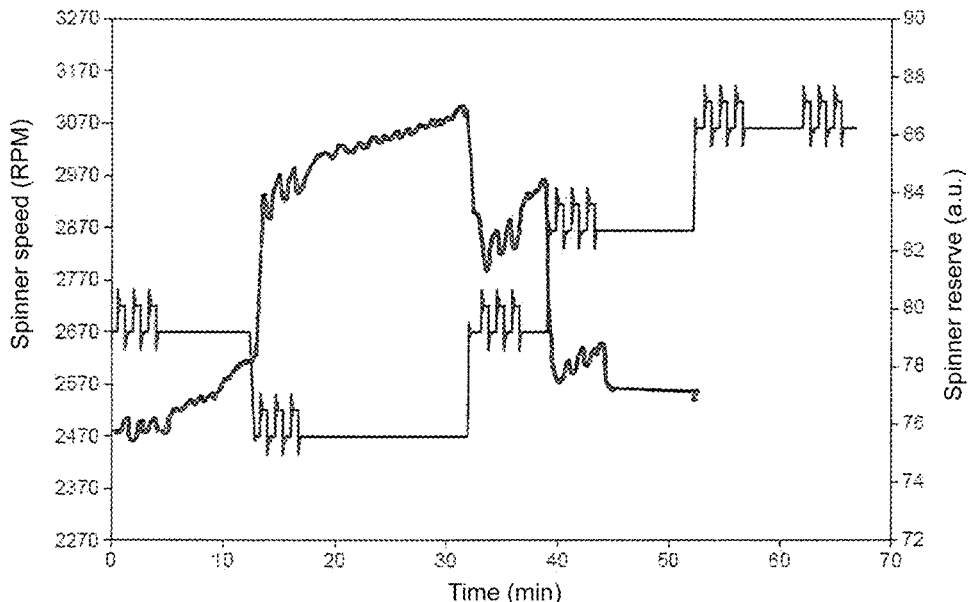
[Fig. 5]
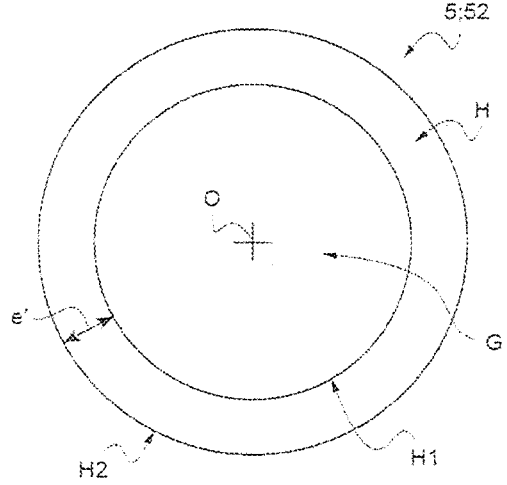

METHOD FOR CONTROLLING A FIBERIZING DEVICE

CROSS-REFERENCE TO RELATED APPLICATIONS

This application is the U.S. National Stage of PCT/FR2022/051062, filed Jun. 3, 2022, which in turn claims priority to French patent application number 2105959 filed Jun. 7, 2021. The content of these applications are incorporated herein by reference in their entireties.

The invention relates to a method for forming glass fibers.

The method according to the invention applies in particular to the industrial production of mineral wool that is intended to be used, for example, in the composition of thermal and/or acoustic insulation products.

A device for forming glass fibers—or fiberizing device—comprises typically a centrifuge, also called a fiberizing spinner, including an annular wall referred to as a "primary" wall or "strip" pierced by a plurality of orifices (hereinafter primary orifices). The fiberizing device also comprises a shaft intended to be rotated by a motor and to which the centrifuge is attached.

There are various types of fiberizing devices: In some cases, the so-called "bottom" centrifuge is closed at its lower end. In this case, in operation, a stream of molten glass coming from suitable supply means flows directly to the bottom of the centrifuge. Under the effect of centrifugal force, the molten glass is sprayed onto the primary annular wall where it forms a primary reserve of glass.

In other cases, the so-called "bottomless" spinner is open at its lower end. In these cases, generally, the shaft is hollow and connected at its upper end to the molten glass supply means. At its lower end, the shaft is connected to a basket located inside the centrifuge and intended to be rotated with the centrifuge and the shaft. The basket comprises a secondary annular wall pierced by a plurality of orifices.

When the device for forming glass fibers is in operation and the centrifuge, shaft, and basket are rotated about the axis of the shaft, molten glass flows into the shaft to the basket. Under the effect of the rotation, the molten glass is sprayed onto the secondary annular wall of the basket where it forms a secondary reserve, passes through the plurality of secondary orifices of the basket and, in the form of bulky filaments, is sprayed onto the primary peripheral wall of the centrifuge where it forms the primary reserve.

In both cases (centrifuge with bottom or bottomless), under the effect of centrifugal force, the glass of the primary reserve is sprayed by the primary orifices in the form of filaments. These filaments are then subjected to the action of an annular pull current at high temperature and high speed hugging the wall of the spinner, which current thins them and transforms them into fibers. The fibers formed are entrained by this gaseous pull current to a receiving device generally consisting of a strip permeable to gases. This method is called "internal centrifuging".

This method has been the subject of numerous improvements, particularly relating to the centrifuge, which aim to improve the quality of the fibers.

It has for example been established that the distribution of the primary orifices over annular rows with the diameter of the orifices decreasing from the rows located on the top of the strip to its lower part makes it possible to improve the quality of the fiberizing.

Further improvements have been made to this basic principle, as taught in particular in the document FR-A-2

443 436, in which means make it possible to obtain a laminar flow of the molten material from top to bottom of the strip of the spinner.

Another modification, described in the document EP-A-1 370 496, has been made to enhance the quality of the fibers and increase the efficiency. This modification entails distributing the orifices of the strip in a plurality of annular areas arranged one above the other, with at least two annular areas having a number of orifices per unit of surface area which is different by a value greater than or equal to 5%.

The invention also aims at improving the quality of the fibers obtained.

It proposes an improvement in the method for forming glass fibers described above.

The invention thus relates to a method for forming glass fibers by means of a rotary assembly including:

a shaft rotated about an axis of rotation, a centrifuge secured to the shaft and provided with a primary annular wall comprising a plurality of primary orifices, and means for supplying the centrifuge with molten glass wherein, under the effect of the centrifugal force resulting from the rotation of the rotary assembly, a primary reserve of glass is formed against the primary annular wall of the centrifuge, the method comprising the following steps:

a) the acquisition, using a camera, of at least one primary image of the centrifuge, b) the processing of said at least one primary image by an image processing system, and c) the evaluation of a parameter representative of the volume of the primary reserve by a system for processing the data from the primary image.

The invention proposes to automatically evaluate one parameter of the fiber-forming method, which has been established as having an influence on the quality of the fibers obtained and on the good working order of the centrifuge; namely, the volume of the reserve of molten glass formed against the annular wall of the centrifuge.

As explained above, when the centrifuge is rotated and supplied with molten glass, a primary permanent reserve of molten glass is formed against its peripheral strip to feed the plurality of primary orifices of the centrifuge.

The volume of glass contained in the primary tank of the centrifuge is an important parameter in the operation of the fiberizing device. This volume defines the pressure applied to the molten glass. However, this pressure determines the speed at which the glass exits through the primary orifices, which itself influences the quality of the filaments produced. Thus, it has been established that:

If the pressure applied to the molten glass is too low, the filaments exiting the spinner have a hook shape. The resulting fibers are of poor quality.

If the pressure is too high, because the volume of the reserve has become too large, the molten glass located furthest from the burner, toward the inside of the centrifuge, can begin to cool, or even to harden, which can damage the centrifuge. In some cases, molten glass may even protrude from the centrifuge through its lower opening, with the risk of fire risks.

Controlling a parameter representative of the volume of the primary reserve makes it possible to control this pressure, and optionally to adjust the operation of the glass fiber forming device in real time.

The parameter evaluated is a parameter representative of the volume of the reserve. The real volume is not necessarily calculated within the scope of the claimed method. The parameter evaluated can in particular be proportional to this volume. This is for example a (horizontal) thickness of the reserve calculated geometrically from a height of glass measured on the primary image and of the centrifuge characteristics and of the camera.

The method according to the invention applies to all types of fiberizing devices.

In particular, the primary image acquired by the camera can be an image of at least a part of the bottom of the rotary assembly. This image shows at least a lower part of the centrifuge.

According to one example, the centrifuge includes an opening at its lower end, and in step a) the primary image is acquired through this opening. It is said that the centrifuge is "bottomless". For example, the primary annular wall includes free lower edges or the primary annular wall is extended, at its lower end, by a lower wall or cuff extending towards the interior of the centrifuge and forming an angle with the annular wall, an opening being delimited by the free edge of the cuff.

In this case, in particular, the camera used in step a) preferably has an observation direction forming an angle with the axis of rotation. In this way, the camera can in particular directly view the free surface of the primary reserve oriented toward the axis of the centrifuge.

According to another configuration, the centrifuge includes a bottom (solid), and the image acquired is an image of at least part of the bottom of the centrifuge. In this case, the volume of the primary reserve can be evaluated from the color variation on the bottom of the centrifuge, in particular obtained either by optical camera operating with visible light or by infrared camera: the bottom of the centrifuge has a higher temperature at the location where the stream of glass falls vertically than it does in line with the reserve (the glass having had time to cool off a little during its spraying towards the primary annular wall). The boundaries of the reserve can be obtained by image processing (contrast, thresholding, etc.)

As an alternative, in particular in the case of a centrifuge with a bottom (solid), the image can in some cases be acquired from the top of the centrifuge.

According to one example, in step b) the image processing comprises the identification of at least one boundary of the primary reserve on the primary image.

According to one example, the at least one boundary comprises the edge of the centrifuge opening and the upper edge of the primary reserve.

According to one example, the identification of the at least one boundary comprises the determination of at least one series of points by a digital method for detecting contours, in particular by thresholding, and the ellipse adjustment of said series of points.

According to one example, the image acquisition in step a) is carried out using an infrared camera.

According to one example, the method comprises, prior to step c), a step b') of calibrating the data processing system by measuring an element of the rotary assembly on the acquired primary image and comparing the measured value with the known dimension of said element.

According to one example, the method further comprises, at the end of at least one succession of steps a) to c), a step d) of determining a deviation of the volume of the primary reserve relative to a nominal value and of adjusting the speed of rotation of the rotary assembly as a function of said deviation.

According to one example, prior to step d), at least N successions of steps a) to c) are carried out, in particular N successions regularly spaced over time, for example at least 30 seconds.

According to one example, when the rotational speed of the rotary assembly reaches a predetermined maximum value at the end of step d), an alert is emitted.

In the case where the centrifuge includes an opening at its lower end, the rotary assembly usually includes a basket arranged below the shaft, secured to the shaft and provided with a secondary annular wall comprising a plurality of secondary orifices, and under the effect of the centrifugal force resulting from the rotation of the rotary assembly, a secondary reserve of glass is formed against the secondary annular wall. In this case, advantageously, it is also possible to view the bottom of the basket by virtue of the camera (or another camera) and the method may further comprise the evaluation of a parameter representative of the volume of the secondary reserve by the system for processing data coming from said at least one primary image of the centrifuge or another so-called secondary image.

In particular, the volume of the secondary reserve can be evaluated from the color variation on the bottom of the basket, in particular obtained either by optical camera operating with visible light or by infrared camera: the bottom of the basket has a higher temperature at the location where the stream of glass falls vertically than it does in line with the secondary reserve. The boundaries of the reserve can be obtained by image processing (contrast, thresholding, etc.)

The invention also relates to a device for forming glass fibers comprising a rotary assembly including:
  a shaft rotated about an axis of rotation,
  a centrifuge secured to the shaft and provided with a
    primary annular wall comprising a plurality of primary
    orifices,
the rotary assembly being configured such that, under the effect of the centrifugal force resulting from its rotation, a primary reserve of glass is formed against the primary annular wall,
and the device further comprising:
  means for acquiring at least one primary image of the
    centrifuge,
  a system for processing said at least one primary image,
    and
  a data processing system configured to evaluate a param-
    eter representative of the volume of the primary reserve
    from the data from the primary image.

The invention also relates to a computer program comprising instructions for executing at least steps b) and c) of the method defined above, when said program is executed on a computer.

According to one example, the computer program further comprises instructions for the execution of step d) mentioned above, when said program is executed on a computer.

The invention also relates to a computer-readable medium, on which such a computer program is recorded.

Other features and advantages of the invention will now be described in relation to the drawings, in which:

FIG. 1 shows a section, along an axial plane, of a device for forming glass fibers according to the invention;

FIG. 2 is a detailed view of FIG. 1;

FIG. 3 is an example of an image acquired by the camera of FIG. 1 (in negative, for better viewing);

FIG. 4 shows the test result showing the impact of variations in the speed of rotation of the rotary assembly on the volume of the secondary reserve;

FIG. 5 is a schematic illustration of the basket as it would be seen by a camera oriented in the direction of the axis of rotation.

FIG. 1 represents a cross-sectional view of a glass fiber forming device 100 according to the invention.

The device 100 for forming glass fibers comprises a rotary assembly 1 rotating around an axis A, under the effect of a drive motor 8.

The rotary assembly 1 comprises a shaft 2, of axis A, intended to be rotated by the motor 8.

The device further includes a centrifuge 3 comprising an annular side wall (hereinafter the primary wall) 30 pierced by a plurality of orifices (hereinafter primary orifices) 31 and a web 32 forming the top of the centrifuge 3. In the example, the centrifuge 3 is fastened to the shaft 2 via a tulip 4, which is in the extension of the web 32. When the glass fiber forming device 100 is in the fiberizing position, the axis A is vertical.

In the remainder of this document, "up", "down", "above" and "under" and "upper" and "lower" parts are defined relative to a vertical axis when the centrifuge 1 is in the centrifuging position, that is to say when the axis of rotation A of the centrifuge is on a vertical axis, as in [FIG. 1].

In the particular example shown, the primary annular wall 30 is extended, at its lower end, by a lower wall or cuff 33 extending towards the inside of the centrifuge 3 and forming an angle with the primary annular wall 30. Here, the cuff 33 extends almost horizontally in the fiberizing position. A central opening 34 (here of circular cross-section) is delimited by the free edge of the cuff 33. It is said that the centrifuge 1 is "bottomless".

As shown in [FIG. 1], the shaft 2 is hollow. It comprises a central channel 20 connected, at its upper end, to means (not shown) for supplying molten glass. At its lower end, the shaft 2 is connected to a basket 5 comprising a secondary annular side wall 50 pierced by a plurality of orifices called secondary orifices 51, and a bottom 52. The basket 5 is located inside the centrifuge 3, as can be seen in [FIG. 1].

The device for forming glass fibers 100 also comprises at least one annular burner 6 generating a high-temperature gaseous drawing jet. The gas drawing jet is a high-temperature gas stream (typically 1350° C. to 1600° C.), which leaves the annular burner 6 through its outlet 60, such that the gas drawing jet is tangential to the annular wall 30 of the centrifuge 3. In the fiberizing position, the outlet 60 of the annular burner 6 is situated above the primary annular wall 30 of the centrifuge 3.

When the device for forming glass fibers 100 is in operation, the centrifuge 3, the shaft 2 and the basket 5 are rotated about the axis A. Molten glass flows into the shaft 2 from the molten glass supply means, to the basket 5. Under the effect of the rotation, the molten glass is sprayed onto the secondary annular wall 50 of the basket 5 forming a permanent reserve R2 (hereinafter secondary reserve) against said annular wall 50. The molten glass coming from said secondary reserve R2 passes through the plurality of secondary orifices 51 (with a diameter comprised between about 1.5 mm and 3 mm) of the basket 5 and, in the form of bulky filaments V1 (of the order of 2 mm in diameter), is sprayed onto the primary annular side wall 30, usually called the "strip", of the centrifuge 3. A primary permanent reserve of molten glass R1 is then formed in the centrifuge 3, in order to feed the plurality of orifices 31 pierced in the primary annular wall 30. Molten glass finally passes through the plurality of primary orifices 31 (with a diameter comprised between about 0.5 mm and 1 mm) of the centrifuge 3 to form pre-fibers V2. Under the action of the gaseous drawing jet from the burner 6, the pre-fibers V2 are stretched, their terminal portion generating discontinuous fibers V3 that are then collected under the centrifuge 3.

In accordance with the invention, the device taken as an example comprises means intended to evaluate in an automated manner the volume of the primary reserve R1 of the centrifuge.

These means comprise:

means for acquiring at least one primary image of the centrifuge 3, a system 72 for processing said at least one primary image, and a data processing system 74 configured to evaluate a parameter representative of the volume of the primary reserve from the data from the image.

The image acquisition means herein comprise a camera 7, oriented toward the bottom of the rotary assembly 1.

The parameter representative of the volume of the primary reserve R1 is explained in connection with [FIG. 2], which is a detail view of [FIG. 1].

On this view of the rotary assembly 1 in section in an axial plane (that is, including the axis A), a first reference point P1 is identified corresponding to the inner junction line between the side wall 30 of the centrifuge 3 (which extends generally substantially vertically) and the web 32 that is rounded, having radius of curvature RC.

A high point M of the reserve R1 is also identified, corresponding to the upper boundary of the primary reserve R1. The high point M is typically a point of the web 32, but may, in the case of zero reserve R1, be a point of the side wall 30.

Finally, a second reference point P2 corresponding to the upper boundary of the edge 33a of the cuff 33 is identified.

The parameter representative of the volume of the reserve R1, evaluated by the data processing system 72, is for example the thickness e of the reserve, which corresponds to the distance measured horizontally, between the reference point P1 and the high point M.

In accordance with the invention, the thickness e of the reserve is determined by acquisition of a primary image of the centrifuge 3, by the camera 7, and use of said image.

In the example, the camera 7 is oriented so as to acquire an image showing at least a portion of the upper boundary of the edge 33a of the cuff 33 and a portion of the upper boundary of the primary reserve R1. The direction of observation of the camera forms an angle φ different from 0 or 90° with the horizontal, and therefore an axis 90-φ with the axis of rotation A. In practice, as shown in [FIG. 1], the optical axis of the camera is oriented in the direction of the center O of the lower face of the basket 5.

An example of an image acquired in this way by a matrix camera (in negative) is shown in [FIG. 3] and will be described in more detail below.

The camera 7 can be a matrix camera or, particularly advantageously, an infrared camera.

The camera is connected to a computer 70, comprising a computer program implementing the processing system 72 of the image(s) acquired by the camera, and the data processing system 74, communicating with the image processing system 72.

In practice, the computer program comprises instructions acquisition of an image, here the primary reserve R1, processing of the images by the image processing system 72, processing the data from the image processing, by the data processing system 74, when executed on a computer.

For each image acquired by the camera 7, the image processing system 72 detects the upper boundary of the reserve R1 and the upper boundary of the edge 33a of the cuff 33, for example by a method of the "contour detection" type. This type of detection, which is well known, consists of identifying the points of the image that correspond to an abrupt change in light intensity. Several methods exist, which include for example thresholding, or determining the contrast gradient of the image.

Contour detection is very advantageously completed by an ellipse adjustment step of the contour thus determined.

In [FIG. 3], the ellipse E1 corresponds to the upper boundary of the primary reserve R1. The ellipse E2 corresponds to the upper boundary of the edge 33a of the cuff 33. The ellipse E3 corresponds to the outer contour of the bottom 52 of the basket 5.

Once the contours of the reserve R1 have been identified, the data processing system 72 is able to calculate the thickness of the reserve R1 from the known geometric characteristics of the centrifuge 3, characteristics of the camera 7 used to acquire the image of the reserve R1, and of the height h measured, on the image, between the upper boundary of the reserve and the top of the edge 33a of the cuff 33.

The geometric features of the centrifuge 3 that can be used in the calculation are:

the coordinates x1, y1 of the reference point P1, in a reference frame x, y whose origin is the center of the lower face of the basket 5;

the coordinates x2, y2 of the reference point P2 in the frame x, y;

the radius of curvature RC of the inner face of the web 32;

the distance DC measured horizontally between the center of curvature C of the web E2 and the axis A of the centrifuge 3.

The features of the camera 7 that can be used in the calculation are:

the distance D between the camera 7 and the basket 5;

the angle q between the line of sight and the horizontal;

the focal length f;

the size of each pixel.

From all these parameters, the system can calculate the height h0, thanks to equation 1 below.

$$h0 = \left( (\sin \varphi) \times \left( (y2 - y1)^2 + (x2 - x1)^2 \right)^{\frac{1}{2}} \right) \times \left( \frac{f}{s} \right) \times \left( \frac{1}{D} \right) \qquad \text{[Math 1]}$$

Then the system can calculate e using equations 2 to 5 below, being placed in a reference frame (u, v) of origin P1, u being parallel to the line of sight of the camera:

The ordinate $v_M$ of point M in the reference frame u, v is obtained by equation 2 below:

$$v_M = (h - h_0) \times D \times \frac{s}{f} \qquad \text{[Math 2]}$$

Next:

$$\theta = \varphi + \arctan \left[ \frac{(DC - y1)}{RC} \right] \qquad \text{[Math 3]}$$

The abscissa $u_M$ of point M in the reference frame u, v is obtained by means of equation 4:

$$u_M = -RC \times \sin \theta + \sqrt{RC^2 - (v_m - RC \times \cos \theta)^2} \qquad \text{[Math 4]}$$

Then, e is obtained using equation 5:

$$e = \frac{u_M}{\cos \varphi} + (v_M - u_M^* \times \tan \varphi) \times \sin \varphi \qquad \text{[Math 5]}$$

Advantageously, the data processing system 74 is configured to undergo calibration, before operation or in a regular manner. The contour of the basket 5 identified on the acquired image can be used to perform this calibration from the actual dimensions of the basket 5, which are known, and the dimensions of the contour identified in the image.

The steps of acquiring an image, processing this image in order to extract therefrom the edges of the reserve, and processing the data of the image to determine the thickness of the reserve are advantageously repeated several times, at regular time intervals, for example on the order of 30 seconds.

At the end of one or—advantageously—more successions of these steps, the data processing system 74 determines a deviation of the volume of the primary reserve R1 relative to a nominal value and sends to the drive motor 8 of the shaft 2 a signal to adjust the rotational speed of the rotary assembly proportional to said deviation, typically via a PID.

FIG. 4 shows the test result showing the impact of variations in the rotational speed of the rotary assembly 1 on the volume of the primary reserve R1: The solid curve represents the rotation speed of the centrifuge 3 (in revolutions per minute), and the dotted curve, the variation of the thickness e of the primary reserve R1, with e being in pixels. It is noted that there is a direct correlation between the variation of the speed of rotation and variation of the volume of the reserve.

When the volume of the primary reserve R1 is too great, it is possible to increase the speed of rotation of the rotary assembly up to a maximum operating value of the device (typically 2000 rpm or even 3000 rpm). Beyond this maximum speed value, the data processing system 74 can be configured to transmit a signal to an alert device 9, which may be any device able to indicate to an operator the need to adjust other parameters, in particular the temperature of the glass supplying the fiber manufacturing device.

It may also be interesting, in addition to, to evaluate the volume of the secondary reserve inside the basket 5.

On the image reproduced in [FIG. 3] acquired by the camera, the lower face 52 of the basket 5 is visible.

The image, here negative, reveals a dark center ring G (lighter in reality) and a lighter peripheral ring H (darker in reality).

The central light ring G is the area of the basket 5 that comes into direct contact with the molten stream of glass falling vertically through the supply channel 20 and whose temperature T is very high.

The darker peripheral ring H is the zone of the bottom of the basket 5 in contact with the molten glass of the secondary reserve R2, the temperature of which has already dropped and is less than T.

In one variant embodiment, the camera 7 or an auxiliary camera could be configured to acquire an image different from the primary image and said secondary image of the basket 5, for example in an observation direction aligned with the axis of rotation A of the rotary assembly 1. Such a secondary image of the basket seen from the bottom is schematically shown in [FIG. 5].

Advantageously, the image processing system 72 is adapted to detect boundaries of the peripheral ring H, by thresholding, and approximate these boundaries by ellipses or as in [FIG. 5] by concentric circles H1, H2 (the line of sight of the camera being vertical in this case).

The data processing system 74 can then determine the thickness e' of the ring H, in other words the distance between said contours H1, H2, which is representative of the volume of the secondary reserve R2.

The evaluation of the secondary reserve described in this way can be transposed identically to the evaluation of the volume of the primary reserve R1 in the case of a centrifuge of the "with bottom" type. The image of the bottom of the centrifuge, acquired by the camera, will be identical in principle to the images of the basket bottom shown in FIGS. 3 and 5: it will show a central light ring, and a darker peripheral ring, the thickness of which will be representative of the volume of the primary reserve R1. The description is therefore not detailed further here.

The invention claimed is:

1. A method for forming glass fibers by a rotary assembly including:

a shaft rotated about an axis of rotation, a centrifuge secured to the shaft and provided with a primary annular wall comprising a plurality of primary orifices, and a supply system configured to supply the centrifuge with molten glass, and wherein, under the effect of a centrifugal force resulting from a rotation of the rotary assembly, a primary reserve of glass is formed against the primary annular wall of the centrifuge, the method comprising the following steps:

a) acquiring, using a camera, at least one primary image of the centrifuge, b) processing said at least one primary image by an image processing system, and c) evaluating a parameter representative of a volume of the primary reserve by a system for processing data from the at least one primary image.

2. The method according to claim 1, wherein the centrifuge includes an opening at its lower end, and in step a) the at least one primary image is acquired through said opening.

3. The method according to claim 2, wherein in step b) the image processing comprises an identification of at least one boundary of the primary reserve on the at least one primary image, and wherein the at least one boundary comprises an edge of the opening of the centrifuge and an upper edge of the primary reserve.

4. The method according to claim 1, wherein in step b) the image processing comprises an identification of at least one boundary of the primary reserve on the at least one primary image.

5. The method according to claim 4, wherein the identification of the at least one boundary comprises a determination of at least one series of points by a digital method for detecting contours and an ellipse adjustment of said at least one series of points.

6. The method according to claim 5, wherein the determination of at least one series of points for detecting contours is done by thresholding.

7. The method according to claim 1, wherein the camera used in step a) has an observation direction forming an angle with the axis of rotation.

8. The method according to claim 1, wherein the camera is an infrared camera.

9. The method according to claim 1, comprising, prior to step c), a step b') of calibrating the data processing system by measuring an element of the rotary assembly on the acquired at least one primary image and comparing the measured value with a known dimension of said element.

10. The method according to claim 1, further comprising, at the end of at least one succession of steps a) to c), a step d) of determining a deviation of the volume of the primary reserve relative to a nominal value and of adjusting a rotational speed of rotation of the rotary assembly as a function of said deviation.

11. The method according to claim 10, wherein prior to step d), at least N successions of steps a) to c) are carried out, wherein N≥2.

12. The method according to claim 11, wherein said N successions are N successions regularly spaced over time.

13. The method according to claim 12, wherein said N successions are N successions regularly spaced every at least 30 seconds.

14. The method according to claim 10, wherein, when the rotational speed of the rotary assembly reaches a predetermined maximum value at the end of step d), an alert is emitted.

15. The method according to claim 1, wherein the rotary assembly further includes a basket arranged below the shaft, secured to the shaft and provided with a secondary annular wall comprising a plurality of secondary orifices, and under the effect of the centrifugal force resulting from the rotation of the rotary assembly, a secondary glass reserve is formed against the secondary annular wall and the method further comprises evaluating a parameter representative of a volume of the secondary reserve by the data processing system from said at least one primary image of the centrifuge or another image.

* * * * *